T. J. MARINUS, OF INDEPENDENCE, IOWA.

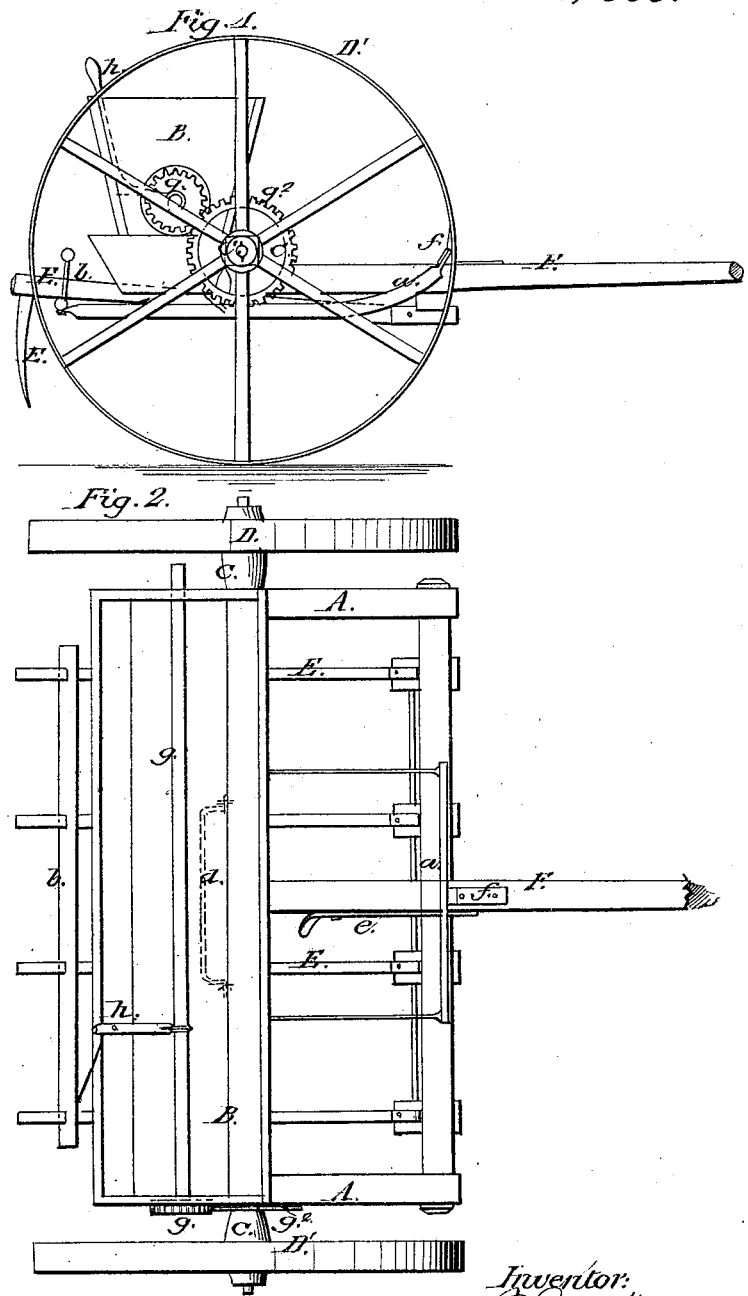

Letters Patent No. 87,951, dated March 16, 1869.

IMPROVEMENT IN CULTIVATOR.

The Schedule referred to in these Letters Patent and making part of the same.

*To all whom it may concern:*

Be it known that I, T. J. MARINUS, of Independence, in the county of Buchanan, and State of Iowa, have invented certain new and useful Improvements in Cultivators; and I do hereby declare that the following is a full, clear, and exact description thereof, reference being had to the accompanying drawings, and to the letters of reference marked thereon, which form a part of this specification, and in which—

Figure 1 represents a side elevation, and

Figure 2, a plan view of my seeder and cultivator.

The nature of my invention consists in the construction of a machine for the purpose of cultivating and seeding the ground, and in which are combined cheapness and simplicity, as will be hereinafter more fully set forth.

To enable others skilled in the art to which my invention appertains, to make and use the same, I will now describe its construction and operation.

In the accompanying drawings—

A designates a frame, upon which are secured the seed-box B and axle C, the axle C being provided with wheels D D'.

Secured to the under side of the front bar of frame A, are blocks, which are recessed, or slotted, so as to receive the inner ends of the cultivator-bars E, to the outer ends of which are attached the teeth E'.

The bars E are secured in place by a metal rod passing through them and the blocks into which they are inserted.

$a$ designates a foot-lever, consisting of two curved bars, fastened at their front ends by a cross-piece, upon which the foot rests, and secured at their outer ends to a frame, $b$, the said bars being pivoted, near their centre, to pendants secured to the side of axle C, by means of a crank-shaped metal rod, $d$, as shown in dotted lines, fig. 2.

$b$ designates a frame, embracing the cultivator-bars near their outer ends, and made as seen in the drawings.

The object of this device is to elevate and depress the cultivator-teeth, when so desired.

$e$ is a lever, pivoted to the side of the tongue F, for the purpose of raising the foot-lever $a$, and $f$ is a catch, for holding the said lever $a$ down, when the teeth are elevated.

Within the seed-box B is situated the agitator-bar $g$, for shaking the seed through the openings in the bottom of said box.

To this bar, on one end, is placed a pinion, $g^1$, which gears with another pinion, $g^2$, on the wheel D'.

The end of the seed-box, where pinion $g^1$ is situated, is cut away, or provided with a circular groove, or recess, so as to allow the said pinion $g^1$, on its shaft, or bar $g$, to be disengaged from pinion $g^2$, or slide back and forth, in order to accomplish the above result.

$h$ designates a lever, pivoted, at or near its centre, to the inner side of the seed-box, and having its lower end fitting against a shoulder on the agitator-bar $g$, and by means of which it may be operated.

What I claim, and desire to secure by Letters Patent, is—

The arrangement of the seed-box with a recess, into which the pinion attached to the agitator-bar enters when thrown out of gear, foot-lever $a$, frame $b$, lever $e$, cultivator-bars E, provided with teeth E', and catch $f$, the whole constructed and operated as set forth.

In testimony that I claim the foregoing as my own, I affix my signature, in presence of two witnesses.

T. J. MARINUS.

Witnesses:
LLOYD EBERHART,
D. B. CUTTER.